United States Patent [19]
Kerby

[11] 4,023,915
[45] May 17, 1977

[54] PRESSURIZED WATER WHEEL

[76] Inventor: William S. Kerby, 5102 N. Seneca, Wichita, Kans. 67204

[22] Filed: Aug. 11, 1975

[21] Appl. No.: 603,358

[52] U.S. Cl. .................................. 415/2; 415/8; 415/148; 415/202; 415/203
[51] Int. Cl.² ...................... F01D 1/08; F01D 25/24
[58] Field of Search .................................. 415/2–4, 415/8, 66, 148, 202, 203

[56] References Cited

UNITED STATES PATENTS

| | | | |
|---|---|---|---|
| 1,436,933 | 11/1922 | Banki | 415/202 |
| 1,474,571 | 11/1923 | Wielgolaski | 415/202 |
| 1,792,761 | 2/1931 | Ring | 415/202 |

FOREIGN PATENTS OR APPLICATIONS

| | | | |
|---|---|---|---|
| 559,239 | 9/1923 | France | 415/2 |
| 1,041,534 | 10/1953 | France | 415/202 |
| 9,651 | 12/1923 | Netherlands | 415/8 |
| 4,670 | 1907 | United Kingdom | 415/3 |

Primary Examiner—Carlton R. Croyle
Assistant Examiner—Robert E. Garrett
Attorney, Agent, or Firm—John H. Widdowson; Edwin H. Crabtree

[57] ABSTRACT

A waterwheel assembly has entry and outlet flow directing channel portions and a flow directing member below the waterwheel. The waterwheel has a plurality of radially disposed paddles mounted on a rotatable shaft and arranged with spaces between the paddles in open fluid communication in the center portion of the waterwheel. The upper portion of the waterwheel is enclosed in a pressurized air cavity so water is kept in the lower portion of the waterwheel. A method of controlling the water flow in a watershed includes directing water flow through small channels which connect with larger channels with flow controlling waterwheels in the channels at selected location so that releasing water through the waterwheels controls water flow and thus regulates runoff in the watershed area.

5 Claims, 6 Drawing Figures

PRESSURIZED WATER WHEEL

CROSS REFERENCE TO RELATED DOCUMENT

The waterwheel invention disclosed in this application is a subject of a document disclosure number 026943 filed in the Patent Trademark Office, Dec. 26, 1973, by the inventor.

BACKGROUND OF THE INVENTION

This invention is related to waterwheels wherein water passing through the lower portion of a vertical positioned waterwheel rotates same. It is also related to the control of runoff and water flow in a watershed area.

In general prior art waterwheels and water driven turbines are low eficiency prime movers because they are structured such that a substantial portion of the perimeter of the wheel is enclosed in the water and only a small portion of it is subjected to forces from the moving water stream therefore considerable drag is incurred by the major portion of the wheel. In these prior art waterwheels and turbines generally a large head of water is needed to obtain any substantial power output from the device and in such constructions a large head loss is usually occurred through the associated structure necessary to get the water to the blades or paddles of the turbine or waterwheel. Almost without exception waterwheels are operated with water passing onto an upper portion of the wheel and being carried by it to a lower elevation on which requires special channeling and water diversion necessary to get the water to such an elevation and in proper position to fall on the wheel. Obviously these constructions require sizing of the wheel and proportions to the available head and topical location which dictate the size of the waterwheel.

In the current practice water control in a watershed area is accomplished by arranging the water movement such that it passes through a plurality of channels, streams, rivers and the like so the water is moved off of the land at a reasonably rapid rate. This method of water control in watershed area simply provides for rapid removal of the water from the watershed area to move it down stream and eventually to the ocean. This method control has inherent disadvantages in that it causes great amount of soil erosion as well as providing for dangerous conditions flood-wise and times of high rain fall or during spring thaws. An additional disadvantage of this present method of water control is that it does not provide for retention of water onto the land which in turn decreases the amount of water available for replenishing the under ground water supply and maintaining water content in the land.

SUMMARY OF THE INVENTION

In an embodiment of the waterwheel structure of this invention it includes a waterwheel having a plurality of paddles which are arranged so the spaces between the paddles are in open fluid communication in the center portion of the wheel. The waterwheel is mounted in a water flow directing structure having an entry channel and outlet channel to direct water flow through the lower portion of the waterwheel. The waterwheel is enclosed in a housing like structure such that the upper portion thereof is operated in an air cavity. In a specific embodiment of the method of controlling water flow in a watershed area the method includes steps of directing the water flow through a plurality of channels, forming a reservoir in the channels, installing a flow regulating waterwheel at the outlet of each reservoir and releasing water to flow through the waterwheels.

One object of this invention is to provide a waterwheel structure overcoming the disadvantages of the prior arts and devices and thereby providing a high efficiency waterwheel for use with relatively small water heads.

Still, one other object of this invention is to provide a waterwheel structure which has a waterwheel that is rotated about a horizontally disposed axis and has a supporting structure which directs water flow through the lower portion of the waterwheel while maintaining the upper portion of the waterwheel in a pressurized air cavity.

Still, another object of this invention is to provide a waterwheel structure which can be used for the generation of electrical power by utilizing relatively small water heads through channeled flows.

Yet, another object of this invention is to provide a waterwheel which will operate much in the manner of a watergate to regulate the flow of water in a channel that can be used in a watershed area to control motion of water in the watershed area.

Yet, another object of this invention is to provide a method of controlling water flow in a watershed area which retains water on the land in a plurality of interconnecting channels throughout the area and further wherein the water flow from the reservoir is regulated by flow control watergates or flow controlling waterwheels.

Various other objects, advantages, and features of the invention will become apparent to those skilled in the art from the following discussion, taken in conjunction with the accompanying drawings, in which:

Figure 1:
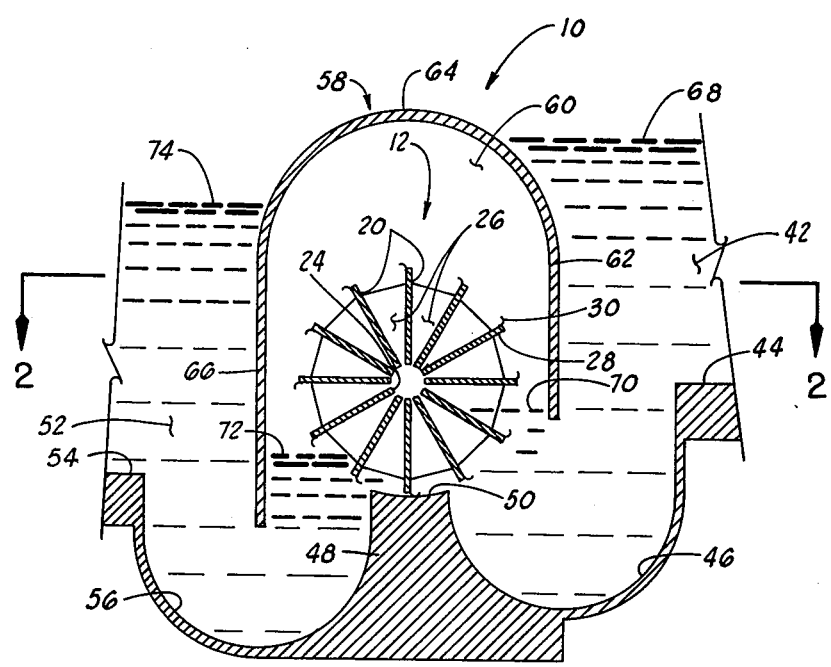
FIG. 1 is a cross sectional elevation view of the waterwheel of this invention shown with water flowing therethrough.
Figure 2:
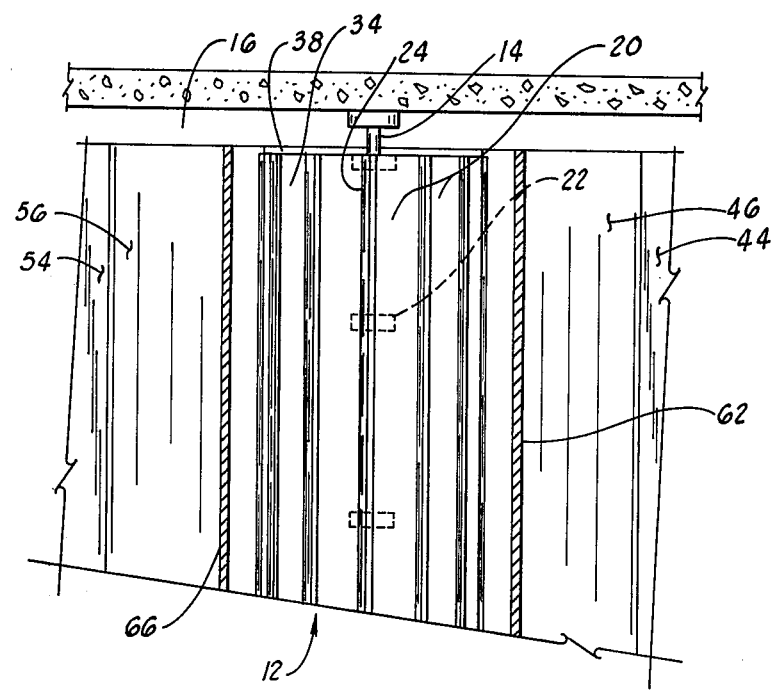
FIG. 2 is a cross sectional view of the waterwheel and associated structure shown in FIG. 1, with this view being taken on a line 2—2 of FIG. 1.

The following is a discussion and description of the specific embodiments of the waterwheel structure and the method of water control in a watershed area of this invention, such being made with reference to the drawings, whereupon the same reference numerals are used to indicate the same or similar parts and/or structures. It is to be understood that such discussion and description is not to unduly limit the scope of the invention.

DETAILED DESCRIPTION

Referring to the drawings in detail and in particular to FIG. 1 wherein the waterwheel and channel flow apparatus of this invention, indicated generally at 10 is shown with water flowing through same from the right to the left. The waterwheel alone, indicated generally at 12 is supported by short shaft 14 extending from its opposite ends which are rotatably mounted in bearings supported on sides 16 and 18 of the flow channel structure. Shaft 14 rigidly supports a plurality of paddles 20.

Shaft 14 is rigidly mounted on paddles 20 by supports 22 at their outer end portions. The inner edge 24 of paddles 20 is displaced from shaft 14 and these inner edges are spaced from one another as shown in FIG. 1. The inner edge 24 of the paddles 20 is attached to the ends of the supports 22 shown in FIG. 3 for maintaining the paddles 20 in a spaced relationship from the shaft 14. Spacing of inner paddle edges 24 is an important feature of the waterwheel structure because it allows open fluid communication between the spaces 26 between paddles 20. Each paddle on its elongated outside edge 28 is provided with a resilient wiper 30. Paddle end edges 32 and 34 are also provided with wipers 36 and 38, respectively. Wipers 30, 36 and 38 rub on interior portions of the flow channel structure will be described hereinafter. Shafts 14 can be fitted with a mechanical gearing, as indicated generally at 40 in FIG. 3, for connecting it with another shaft 42 to utilize rotary power developed by the waterwheel.

Figures 4, 6:
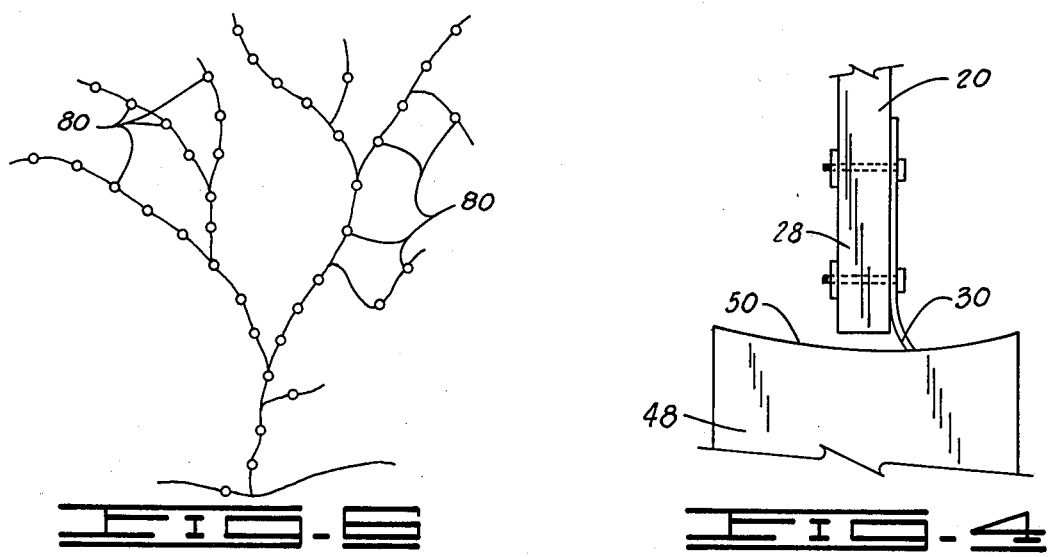
FIG. 4 is an enlarged cross sectional view of the bottom channel flow directing member and the tip of a waterwheel paddle showing the seal member on the paddle.
FIG. 6 is a graphical illustration of a watershed area with a plurality of interconnecting water channels joining together, circles on the channels indicate waterwheels.

The particular flow channel apparatus 10 includes an entry channel leading to waterwheel 12, an outlet channel from the waterwheel and a bottom channel flow directing assembly beneath the waterwheel. Entry channel 42 has a smooth bottom which can be flat if desired to a point immediately ahead of waterwheel 12 at which point the flow channel drops and has a generally semi-cylindrical shaped bottom 46, as shown in FIG. 1. Entry channel 42 joins an upright flow directing member 48 immediately below waterwheel 12. Upright flow directing member 48 has a curved upper surface 50 which is shaped to allow wipers 30 on the paddle edges 28 to rub as they pass. FIG. 4 shows the upper end portion of upright flow directing member 48 with the end of a paddle 20 and wiper 30. Outlet channel 52 can be constructed having a flat bottom 54 downstream from a point located immediately downstream of waterwheel 12 where at such point the channel bottom is preferably partially cylindrically shaped and cross-sectionally round as indicated at 56. Curved channel bottom outlet 56 joins the downstream side of upright flow directing member 48 and extends to a point substantially downstream of waterwheel 12.

It is to be understood that the rounded and partially cylindrical configuration of the channel bottom immediately ahead of and downstream of waterwheel 12 can be changed from that shown if such is the desire of the user. In any circumstance the shape of the channel bottom should be smoothly contoured in a uniform and evenly changing curvilinear shape when seen in cross section in order to provide smooth water flow into and away from waterwheel 12 for the purpose of minimizing turbulence.

Figure 3:
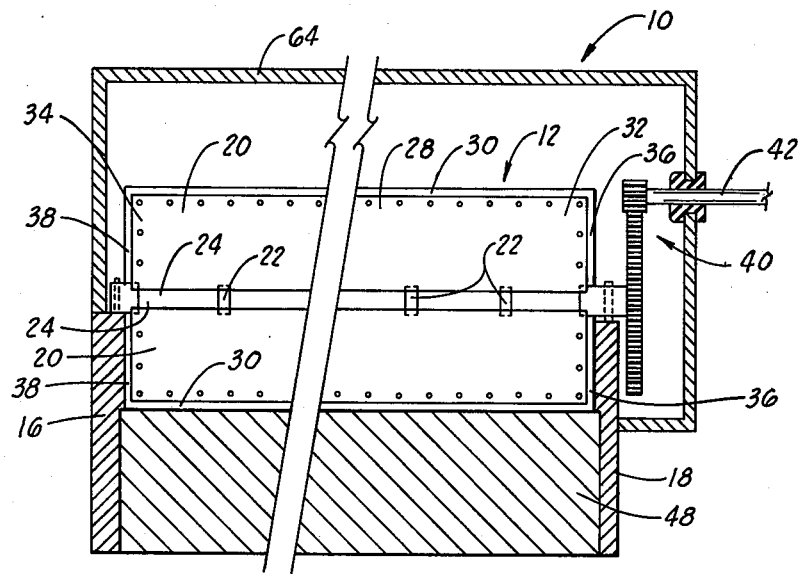
FIG. 3 is a cut away view of the waterwheel and associated structure taken along the axis of rotation of the waterwheel and showing mounting of the waterwheel and paddles in full view with mechanical apparatus for extracting rotary mechanical power.

Waterwheel 12 has the upper portion thereof enclosed in a housing indicated generally at 58 to form an air cavity 60 above the upper portion of waterwheel 12. Housing 58 has an upright entry wall portion 62 extending upward from a point slightly below the elevation of shaft 14. A housing top portion 64 joins the upper portion of entry wall portion 62 and extends downstream over the top of waterwheel 12. It is desirable for the top portion 64 of the waterwheel housing 58 to be disposed above the upper end of paddle 20, as shown in FIGS. 1 and 3, so entry wall 62 and top portion 64 will provide somewhat of a water barrier in entry channel 42. An outlet upright wall portion 66 joins the downstream side of housing top portion 64 and extends to a point substantially below the elevation of the upper end of upright flow directing member 48. Preferably, entry wall portion 62 and outlet wall portion 66 are positioned approximately in the center portion of the rounded channel bottoms 46 and 56 so that water can flow in a smooth flow into and out of waterwheel 12.

FIG. 1 shows in normal operating water levels inside housing 58. In normal operation water at the inlet side of waterwheel 12 is maintained at a water level 70 slightly below the elevation of the upper end of the lowermost paddle in the vertical position. This water level 70 is adjusted by changing air pressure in cavity 60 as necessary to balance it against the head existing between inlet water surface 68. Obviously air pressure in cavity 60 must be precisely regulated and correlated with atmospheric pressure to maintain water surface 70 at the desired point. In the outlet side of waterwheel 12 water passes through spaces 26 between paddles 20 and exits the waterwheel at a water surface level 72 below the elevation of water level 70. The water level 74 in outlet channel 52 is below water surface elevation 68 in entry channel 42, therefore, air pressure in cavity 60 necessary to maintain water surface level 70 as desired will cause water level 72 in the outlet side of waterwheel 12 to be displaced below water level 70. The air pressure in cavity 60 necessary to maintain the surface levels 70 and 72 can be supplied by an air pressure tank, air compressor, or the like, connected to the cavity 60. The air pressure required to maintain the necessary surface levels 70 can be controlled by a float means or any other sensing device co-acting with the source of air pressure. It is to be noted that outlet wall housing portion 66 extends substantially below entry housing wall portion 62. This is necessary to insure that air from cavity 60 does not pass underneath the bottom of outlet wall portion 66. During operation of waterwheel 12, it is to be noted that air passes between paddle spaces 26 as water moves into these spaces at their outer portions along on the periphery of the waterwheel. This feature of the waterwheel structure of this invention keeps the water down below the upper end of the lower vertically disposed paddle so it moves through the lower portion of waterwheel 12. Water is not carried into upper portions of waterwheel 12 except for splashing, which is relatively minor.

Figure 5:
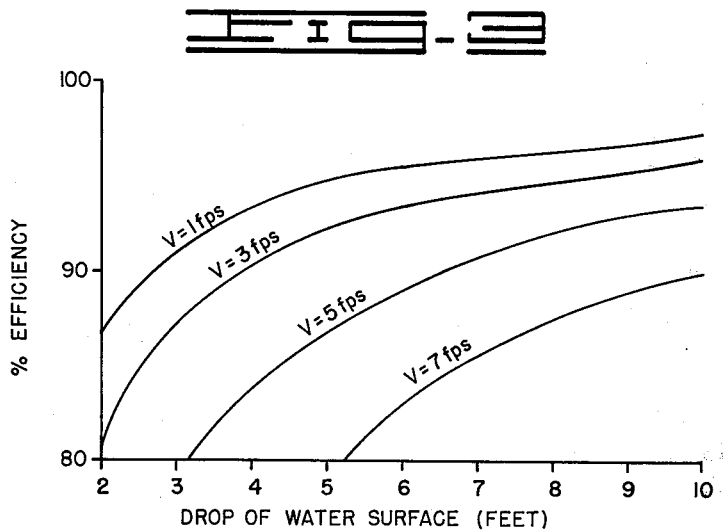
FIG. 5 is a graph of estimated theoretical efficiency for the waterwheel versus drop of water surface for several flow velocities.

FIG. 5 shows an estimated performance chart for the waterwheel and flow channel structure 10 of this invention. In FIG. 5 percentage of efficiency is plotted versus water drop in feet for several water velocities in feet per second. Specific velocities are indicated on the curves. In calculating the curves shown in FIG. 5 head loss is estimated from the following formula:

$$\text{Head Loss} = (V^2/2g) + 0.25 \text{ feet}$$

In this formula 0.25 is added for head losses within the housing structure. It is to be noted that percent effeciency for even a small drop of water surface for a nominal flow rate is a rather high percentage which is to be compared with conventional turbines as described above which have a percent effeciency of generally less than 10%. Considering losses from headwater elevation to turbine inlet, losses from turbine outlet to tailwater and leaks. From FIG. 5 it is obvious that the waterwheel and flow channel structure of this invention are desired to operate at a very high efficiency with relatively low head conditions. Relatively low head conditions includes a total head from inlet to outlet of below ten feet. In the operation of the waterwheel of this invention it is preferably sized so that average velocity of water through the waterwheel is within the range of 1 to 10 feet per second. On the average it is expected that the average velocity through the waterwheel will be within the range of 2 to 3 feet per second for normal conditions with peak flow rates having an average velocity of between 5 to 10 feet per second. Obviously the rotational speed entirely developed by the waterwheel and flow channel apparatus of this invention would be dependent on the radius of the waterwheel, the head pressure, leaks, head pressure losses and other factors. However, it is to be understood that mechanical rotating power produced by waterwheel 12 can be coupled to generators for the production of electrical power or it can be connected to other mechanical devices for making use of the rotary power.

In regard to the method of controlling water flow in a watershed area of this invention it is to be understood that this method differs substantially from presently practiced methods of watershed control. The novel method of this invention was conceived and designed with the full intention of utilizing the novel waterwheel structure of this invention. Basically the novel method of this invention involves close regulation of runoff and retention of water on the land for later release through the waterwheels to extract useful work from the water as it moves downstream at a later time under regulated conditions.

In applying the waterwheel and flow channel structure of this invention to a watershed area it is initially necessary to arrange the streams, water flow channels, rivers, etc. in the watershed area in a general arrangement as illustrated in FIG. 6. In FIG. 6 the water carrying channels indicated by the lines are connected in a branching fashion so that water picked up by one stream will move into other connected channels. Each of the water carrying channels or the like are positioned in the watershed area to pick up runoff from a designated area in the adjacent terrain. Along these channels or the like a plurality of flow regulating waterwheels are installed as indicated by the circles 80 in FIG. 6. These waterwheels are installed at selected locations spaced along the channels to temporarily store water in the connecting channels. The channels which connect the waterwheels are each arranged such that it's surface water is virtually level. At the outlet of each of the reservoirs a flow regulating waterwheel is installed. The flow regulating waterwheels are namely the waterwheel and flow channel structure as described above. It is to be noted that by selective placement of the waterwheels the water surface drop in the channels can be adjusted for each to be within the desired operating range of the waterwheel and flow channel apparatus 10.

In operation of a watershed area the water flow control is regulated by releasing water through the flow regulating waterwheels at a rate such that it maintains an essentially smooth, level, and practically non-turbulent flow in the water channel. A flow rate of ½ feet per second or less will substantially eliminate significant soil erosion problems. By releasing water so that it flows through the channels in this manner the problem of soil erosion is minimized. Also a great quantity of water is held onto the land so that is can be absorbed by the land and available for use as needed. An additional feature in retaining water on the land is that is lessens the impact of peak rains which endanger flood-prone areas downstream. It is to be noted that by regulating water flow so that it moves normally in a non-turbulent flow through the channels it substantially eliminates soil erosion and eliminates the necessity for paved channels, riprap, and other expensive flow control facilities necessary with present state of the art high velocity water channels. Also the low velocity non-turbulent flow will allow particles in the water to drop out thus clarify water in the channel.

In the selection of the sites for the flow regulating waterwheels they are preferably chosen where elevation drops between the upper channel water surface and lower channel water surface and can be arranged to be between 2 and 10 feet. More preferably the sites are selected at points where elevation drops are within the range of 3 to 8 feet. It is to be noted that by selecting the flow regulating waterwheel sites in designated areas which are not too remote from civilization these devices can be used for the generation of electrical power for utilization by residents of the immediate area or connected with a power transmission network for use at a distant point.

In the manufacture of the waterwheel structure and associated apparatus of this invention it is obvious that it can be constructed to achieve the end product with far less effort than required from some state of the art hydroelectric plants and water regulating and retaining facilities. Because the waterwheel structure and the flow channel structure is relatively simple in form it can be cast or formed of concrete or other suitable materials with the waterwheel being constructed much as conventional turbines, waterwheels, pumps and the like are constructed. In utilizing a watershed water control method of this invention it is obvious that the waterwheel, flow channel directing structure and flow regulating apparatus of this invention make it possible to carry out the method as disclosed. The method of water control in a watershed area is unique to the present art because it retains water on the land and carefully regulates the rate of runoff by the use of the flow regulating device.

In the use and operation of the waterwheel structure of this invention, it is seen that same provides a waterwheel structure which can be used for the generation of rotary mechanical power and which also can be used to regulate water flow through a channel or the like. In carrying out the method of this invention it is seen that the method of water control for a watershed area regulates the amount of water retained on the land by using interconnected reservoirs and channels. The method of watershed control retains water on the land and regulates runoff so that the flow rate through the channels is relatively low and thereby overcomes disadvantages of the present methods by reducing or substantially eliminating soil erosion while at the same time lessening the danger of flooding downstream. It is to be noted that water channels created by using this invention would provide water for irrigation purposes as well as recreation.

As will become apparent from the foregoing description of the applicant's waterwheel structure a relatively waterwheel apparatus has been provided for use in a channel to generate rotary mechanical power. The waterwheel structure is relatively simple to construct yet it functions with a quite high effeciency and can be used essentially continuously in a water channel with an adequate supply of water. The method of water control of the applicant provides a simple method of controlling water flow in a watershed area by retaining water in reservoirs and regulating its flow rate downstream. The method is economical to utilize as a whole because it utilizes water power to produce rotary mechanical energy which can be used to generate electrical power. Additionally the method of water control is advantageous from a safety point of view because it lessens problems due to flooding and it moves water at a relatively low velocity.

While the invention has been described in conjunction with preferred specific embodiments thereof, it will be understood that this description is intended to illustrate and not limit the scope of the invention, which is defined by the following claims:

I claim:

1. A waterwheel and flow directing means therefor, comprising:
    a. a waterwheel having a plurality of radially disposed paddles mounted on a shaft in a spaced relation with spaces between said paddles being in open fluid communication at the center portion of the waterwheel,
    b. a flow directing means having an entry channel portion in fluid communication with the upstream side of said waterwheel, and outlet channel portion in fluid communication with the downstream side of said waterwheel, and
    c. a housing rigidly mounted over said water wheel,
    d. a means to pressurize an upper portion of said waterwheel mounted over said water wheel in a stationary position, said means to pressurize being constructed and adapted to in use retain air in an upper portion of said waterwheel, and
    e. a bottom channel flow directing member mounted below said waterwheel and having the upper surface thereof contactable with the lowermost portion of said waterwheel paddles as said waterwheel rotates to direct water through a lower portion of said waterwheel,
    f. means to maintain a pressure head on the entry channel portion which is greater than that on the outlet channel portion, said water wheel and flow directing means being constructed and adapted to in use receive water in said entry channel portion, pass same beneath said entry wall, through the lower portion of said waterwheel underneath said outlet wall and out through said outlet channel portion.

2. The waterwheel flow directing means of claim 1, wherein said housing having one wall extending upward from a point essentially immediately below the upper end portion of an essentially vertically positioned paddle located at the bottom portion of said waterwheel in said entry channel portion and having another wall extending upward from a point substantially below said blades in said outlet channel.

3. The waterwheel flow directing means of claim 2, wherein:
    a. said bottom channel flow directing member has an upright portion extending upward from a bottom portion of said channel below said waterwheel,
    b. said inlet channel portion has a recessed portion upstream of said waterwheel extending from a point substantially ahead of said waterwheel to said bottom channel flow directing member, and
    c. said outlet channel portion has a recessed portion downstream of said waterwheel extending from a point substantially downstream of said waterwheel to said bottom channel flow directing member.

4. The waterwheel flow directing means of claim 3, wherein:
    a. said entry channel portion and said outlet channel portion have upright sides in the portion thereof adjacent said waterwheel with said channel sides contacting the sealing relation the opposed ends of said waterwheel,
    b. said housing extends beneath said channel sides, and
    c. said housing extends substantially above said waterwheel and has the upper end thereof above the water level in said inlet channel portion.

5. The waterwheel and flow directing means of claim 4, wherein:
    a. said inlet channel recessed portion and said outlet channel recessed portion have an essentially semicircular curvature,
    b. said shaft is rotatably mounted with said channel sides and is mechanically connected through one of said sides to an external point, and
    c. said paddles have seal means on ends thereof and outer edges thereof to seal with said channel sides and said bottom channel flow directing member, respectively.

* * * * *